US011366572B2

(12) United States Patent
Gabbai et al.

(10) Patent No.: US 11,366,572 B2
(45) Date of Patent: Jun. 21, 2022

(54) MOBILE OPTIMIZED SHOPPING COMPARISON

(71) Applicant: eBay Inc., San Jose, CA (US)

(72) Inventors: Jonathan Gabbai, London (GB); James Tenniswood, Sidcup (GB); Elissa Darnell, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/572,308

(22) Filed: Sep. 16, 2019

(65) Prior Publication Data

US 2020/0012395 A1   Jan. 9, 2020

Related U.S. Application Data

(63) Continuation of application No. 14/556,627, filed on Dec. 1, 2014.

(51) Int. Cl.
*G06F 3/048* (2013.01)
*G06F 3/04847* (2022.01)
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 3/0488* (2013.01); *G06Q 30/0241* (2013.01); *G06F 3/04847* (2013.01)

(58) Field of Classification Search
CPC ........... G06Q 30/0631; G06Q 30/0601; G06Q 10/02; G06Q 30/0633; G06Q 30/0643; G06Q 30/0641; G06F 3/0482; G06F 3/0488; G06F 3/0483; G06F 3/04842; G06F 3/04847
See application file for complete search history.

(56) References Cited

U.S. PATENT DOCUMENTS

| | | |
|---|---|---|
| 5,206,949 A | 4/1993 | Cochran et al. |
| 5,768,581 A | 6/1998 | Cochran |
| 5,880,742 A | 3/1999 | Rao et al. |

(Continued)

FOREIGN PATENT DOCUMENTS

| | | |
|---|---|---|
| CN | 101946249 A | 1/2011 |
| CN | 102930028 A | 2/2013 |

(Continued)

OTHER PUBLICATIONS

Notice of Allowance received for Korean Patent Application No. 10-2019-7013855, dated Jan. 13, 2020, 3 pages (2 pages of Official Copy & 1 page of English translation).

(Continued)

*Primary Examiner* — Steven B Theriault
(74) *Attorney, Agent, or Firm* — FIG. 1 Patents

(57) ABSTRACT

A system comprising a computer-readable storage medium storing at least one program and a computer-implemented method for generating a navigable user interface for a mobile shopping comparison application. In some embodiments, the method may include determining that a query request has indications of item specific attributes for comparison, identifying the most relevant item attributes corresponding to the item specific comparison, and presenting the attributes in conjunction with their corresponding items in a navigable user interface.

20 Claims, 10 Drawing Sheets

(51) Int. Cl.
*G06F 3/0488* (2022.01)
*G06Q 30/02* (2012.01)

(56) References Cited

U.S. PATENT DOCUMENTS

| | | | |
|---|---|---|---|
| 5,963,938 A | 10/1999 | Wilson et al. | |
| 6,026,397 A * | 2/2000 | Sheppard | G06F 16/355 |
| | | | 707/999.005 |
| 6,594,670 B1 | 7/2003 | Genser | |
| 6,694,326 B2 | 2/2004 | Mayhew et al. | |
| 6,760,720 B1 | 7/2004 | De Bellis | |
| 7,035,864 B1 | 4/2006 | Ferrari et al. | |
| 7,096,426 B1 | 8/2006 | Lin-Hendel | |
| 7,149,983 B1 | 12/2006 | Robertson et al. | |
| 7,325,201 B2 | 1/2008 | Ferrari et al. | |
| 7,328,177 B1 | 2/2008 | Lin-Hendel | |
| 7,395,511 B1 | 7/2008 | Robertson et al. | |
| 7,461,059 B2 | 12/2008 | Robertson et al. | |
| 7,580,932 B2 | 8/2009 | Plastina et al. | |
| 7,603,367 B1 | 10/2009 | Kanter et al. | |
| 7,627,812 B2 | 12/2009 | Chamberlain et al. | |
| 7,657,522 B1 | 2/2010 | Puzicha et al. | |
| 7,676,460 B2 | 3/2010 | Morgan | |
| 7,698,261 B1 * | 4/2010 | Khoshnevisan | G06F 16/35 |
| | | | 707/999.003 |
| 7,765,227 B1 | 7/2010 | Khoshnevisan et al. | |
| 7,878,390 B1 | 2/2011 | Batten et al. | |
| 7,930,313 B1 | 4/2011 | Geva | |
| 7,996,282 B1 * | 8/2011 | Scott | G06Q 30/0641 |
| | | | 705/27.2 |
| 8,019,650 B2 | 9/2011 | Donsbach et al. | |
| 8,042,063 B1 | 10/2011 | Lin-Hendel | |
| 8,190,486 B1 | 5/2012 | Ouimet | |
| 8,271,521 B2 | 9/2012 | Vadon et al. | |
| 8,327,296 B2 | 12/2012 | Arscott et al. | |
| 8,438,487 B1 | 5/2013 | Lin-Hendel | |
| 8,442,970 B2 | 5/2013 | Ollis et al. | |
| 8,510,349 B1 | 8/2013 | Puttick | |
| 8,620,891 B1 * | 12/2013 | Thirumalai | G06F 16/9535 |
| | | | 707/705 |
| 8,631,029 B1 | 1/2014 | Amacker | |
| 8,648,823 B2 | 2/2014 | Koch et al. | |
| 8,694,526 B2 | 4/2014 | Costello et al. | |
| 8,713,064 B1 | 4/2014 | Khafizov et al. | |
| 8,745,018 B1 | 6/2014 | Singleton et al. | |
| 8,756,121 B2 | 6/2014 | Gonsalves et al. | |
| 8,793,333 B1 | 7/2014 | Amacker | |
| 8,887,037 B1 | 11/2014 | Cook | |
| 8,935,279 B2 | 1/2015 | Skeen et al. | |
| 8,965,886 B2 | 2/2015 | Puzicha et al. | |
| 9,035,883 B2 | 5/2015 | Yoo et al. | |
| 9,047,369 B2 | 6/2015 | Miao et al. | |
| 9,081,482 B1 | 7/2015 | Zhai et al. | |
| 9,104,718 B1 | 8/2015 | Levy et al. | |
| 9,141,280 B2 | 9/2015 | Van Eerd et al. | |
| 9,342,607 B2 | 5/2016 | Annau et al. | |
| 9,361,640 B1 | 6/2016 | Donsbach et al. | |
| 9,372,592 B1 | 6/2016 | Goodspeed et al. | |
| 9,372,610 B2 | 6/2016 | Munoz et al. | |
| 9,411,899 B2 | 8/2016 | Godsey et al. | |
| 9,424,305 B1 | 8/2016 | Puttick | |
| 9,436,764 B2 | 9/2016 | Ray et al. | |
| 9,471,706 B2 | 10/2016 | L'Archeveque et al. | |
| 9,477,726 B2 | 10/2016 | De Bellis | |
| 9,703,875 B2 | 7/2017 | Konik et al. | |
| 9,830,635 B1 | 11/2017 | Levy et al. | |
| 9,892,118 B2 | 2/2018 | Kumar et al. | |
| 9,959,351 B2 | 5/2018 | Konik et al. | |
| 10,032,205 B2 | 7/2018 | Pathak et al. | |
| 10,114,896 B2 | 10/2018 | Junginger et al. | |
| 10,120,550 B2 | 11/2018 | Kuo et al. | |
| 10,127,603 B2 | 11/2018 | Garera et al. | |
| 10,459,608 B2 | 10/2019 | Gabbai et al. | |
| 10,497,039 B1 * | 12/2019 | Singh | G06F 16/248 |
| 2001/0044758 A1 | 11/2001 | Talib et al. | |
| 2002/0010655 A1 | 1/2002 | Kjallstrom | |
| 2002/0046209 A1 | 4/2002 | De Bellis | |
| 2002/0083039 A1 | 6/2002 | Ferrari et al. | |
| 2002/0087532 A1 | 7/2002 | Barritz et al. | |
| 2002/0103789 A1 | 8/2002 | Turnbull et al. | |
| 2002/0126155 A1 | 9/2002 | Lin-hendel | |
| 2002/0143780 A1 | 10/2002 | Gorman | |
| 2002/0149614 A1 | 10/2002 | Biebesheimer et al. | |
| 2002/0169675 A1 | 11/2002 | Helot et al. | |
| 2002/0194166 A1 | 12/2002 | Fowler | |
| 2003/0018659 A1 | 1/2003 | Fuks et al. | |
| 2003/0023514 A1 | 1/2003 | Adler et al. | |
| 2003/0145277 A1 | 7/2003 | Neal et al. | |
| 2004/0036680 A1 | 2/2004 | Davis et al. | |
| 2004/0080545 A1 | 4/2004 | Kobal et al. | |
| 2004/0163039 A1 | 8/2004 | Gorman | |
| 2004/0186827 A1 | 9/2004 | Anick et al. | |
| 2005/0171940 A1 * | 8/2005 | Fogg | G06F 16/248 |
| 2005/0283468 A1 | 12/2005 | Kamvar et al. | |
| 2006/0026145 A1 | 2/2006 | Beringer et al. | |
| 2006/0095345 A1 * | 5/2006 | Ka | G06Q 30/0641 |
| | | | 705/26.62 |
| 2006/0122872 A1 | 6/2006 | Stevens et al. | |
| 2006/0173824 A1 | 8/2006 | Bensky et al. | |
| 2006/0209040 A1 | 9/2006 | Garside et al. | |
| 2006/0238517 A1 | 10/2006 | King et al. | |
| 2006/0282304 A1 | 12/2006 | Bedard et al. | |
| 2007/0050332 A1 | 3/2007 | Grenzberg et al. | |
| 2007/0061753 A1 | 3/2007 | Ng et al. | |
| 2007/0100862 A1 | 5/2007 | Reddy et al. | |
| 2007/0198306 A1 * | 8/2007 | Crean | G06Q 10/02 |
| | | | 705/5 |
| 2007/0219960 A1 * | 9/2007 | Vadon | G06Q 30/0603 |
| 2007/0226082 A1 * | 9/2007 | Leal | G06Q 30/0643 |
| | | | 705/14.71 |
| 2007/0233726 A1 | 10/2007 | Torrens et al. | |
| 2008/0082426 A1 * | 4/2008 | Gokturk | G06K 9/62 |
| | | | 705/26.62 |
| 2008/0082920 A1 | 4/2008 | Eom | |
| 2008/0120565 A1 * | 5/2008 | Stiso | G06F 3/04847 |
| | | | 707/999.102 |
| 2008/0134100 A1 * | 6/2008 | Ferrari | G06F 16/00 |
| | | | 715/854 |
| 2008/0148140 A1 | 6/2008 | Nakano | |
| 2008/0303796 A1 | 12/2008 | Fyke | |
| 2009/0019031 A1 | 1/2009 | Krovitz et al. | |
| 2009/0070133 A1 | 3/2009 | Bonilla et al. | |
| 2009/0100455 A1 | 4/2009 | Frikker et al. | |
| 2009/0113295 A1 * | 4/2009 | Halpern | A61B 5/14532 |
| | | | 715/273 |
| 2009/0144262 A1 * | 6/2009 | White | G06F 16/242 |
| 2009/0160805 A1 | 6/2009 | Hosokawa et al. | |
| 2009/0204599 A1 | 8/2009 | Morris et al. | |
| 2010/0037153 A1 * | 2/2010 | Rogers | G06Q 10/10 |
| | | | 715/758 |
| 2010/0076960 A1 | 3/2010 | Sarkissian et al. | |
| 2010/0161156 A1 | 6/2010 | Coulmeau et al. | |
| 2010/0164959 A1 | 7/2010 | Brown et al. | |
| 2010/0281417 A1 | 11/2010 | Yolleck et al. | |
| 2010/0306228 A1 | 12/2010 | Carpenter et al. | |
| 2011/0090151 A1 | 4/2011 | Huang et al. | |
| 2011/0109567 A1 | 5/2011 | Kim | |
| 2011/0184941 A1 | 7/2011 | El-charif et al. | |
| 2011/0246574 A1 | 10/2011 | Lento et al. | |
| 2011/0258565 A1 | 10/2011 | Arscott et al. | |
| 2011/0314400 A1 * | 12/2011 | Mital | G06F 16/26 |
| | | | 715/771 |
| 2012/0113007 A1 | 5/2012 | Koch et al. | |
| 2012/0127082 A1 | 5/2012 | Kushler et al. | |
| 2012/0179498 A1 | 7/2012 | Aharoni et al. | |
| 2012/0192112 A1 | 7/2012 | Garrison et al. | |
| 2012/0200503 A1 | 8/2012 | Berenger | |
| 2012/0206363 A1 | 8/2012 | Kyprianou et al. | |
| 2012/0311441 A1 | 12/2012 | Reyna et al. | |
| 2012/0323938 A1 * | 12/2012 | Skeen | H04L 65/4069 |
| | | | 707/754 |
| 2013/0080962 A1 | 3/2013 | Razzaghi | |

(56) References Cited

U.S. PATENT DOCUMENTS

| | | | |
|---|---|---|---|
| 2013/0104063 A1* | 4/2013 | Legris | G06Q 30/06 715/765 |
| 2013/0110671 A1 | 5/2013 | Gray | |
| 2013/0227441 A1 | 8/2013 | Cockcroft et al. | |
| 2013/0246329 A1 | 9/2013 | Pasquero et al. | |
| 2013/0262444 A1* | 10/2013 | Leslie | G06F 16/9038 707/E17.014 |
| 2013/0283195 A1 | 10/2013 | Bilgen et al. | |
| 2013/0325630 A1 | 12/2013 | Mendenhall et al. | |
| 2014/0006409 A1 | 1/2014 | Prosnitz et al. | |
| 2014/0006416 A1* | 1/2014 | Leslie | G06F 16/248 707/E17.014 |
| 2014/0047387 A1 | 2/2014 | Iwabuchi et al. | |
| 2014/0052714 A1 | 2/2014 | Brodziak et al. | |
| 2014/0067613 A1* | 3/2014 | Singhal | G06Q 30/0603 705/26.62 |
| 2014/0172627 A1 | 6/2014 | Levy et al. | |
| 2014/0172821 A1 | 6/2014 | Hu et al. | |
| 2014/0258016 A1 | 9/2014 | Hale et al. | |
| 2014/0279246 A1 | 9/2014 | Chen et al. | |
| 2014/0279248 A1* | 9/2014 | Westphal | G06Q 30/0625 705/26.62 |
| 2014/0282056 A1* | 9/2014 | Godsey | G06F 3/04845 715/744 |
| 2014/0344115 A1 | 11/2014 | Yatsuda et al. | |
| 2015/0012387 A1 | 1/2015 | Katagiri | |
| 2015/0026155 A1 | 1/2015 | Martin | |
| 2015/0046423 A1* | 2/2015 | Weeks | G06F 16/957 707/708 |
| 2015/0066907 A1 | 3/2015 | Somaiya et al. | |
| 2015/0089429 A1 | 3/2015 | Ghassabian | |
| 2015/0111190 A1 | 4/2015 | Vittorio | |
| 2015/0127628 A1 | 5/2015 | Rathod | |
| 2015/0134638 A1 | 5/2015 | Grosman et al. | |
| 2015/0253945 A1 | 9/2015 | Bryant | |
| 2015/0277718 A1* | 10/2015 | Lauer | G06F 3/04847 715/833 |
| 2015/0310005 A1 | 10/2015 | Ryger et al. | |
| 2015/0356186 A1 | 12/2015 | Konik et al. | |
| 2016/0012135 A1 | 1/2016 | Wang et al. | |
| 2016/0103793 A1 | 4/2016 | Fang et al. | |
| 2016/0110441 A1 | 4/2016 | Robinson | |
| 2016/0117740 A1 | 4/2016 | Linden et al. | |
| 2016/0140254 A1 | 5/2016 | Yan et al. | |
| 2016/0154862 A1 | 6/2016 | Gabbai et al. | |
| 2017/0046764 A1 | 2/2017 | Konik et al. | |
| 2017/0075536 A1 | 3/2017 | Cho et al. | |
| 2017/0148091 A1 | 5/2017 | Lin-hendel | |

FOREIGN PATENT DOCUMENTS

| | | |
|---|---|---|
| CN | 103339646 A | 10/2013 |
| CN | 104067307 A | 9/2014 |
| CN | 107408256 A | 11/2017 |
| JP | 2003256093 A | 9/2003 |
| KR | 10-2014-0039575 A | 4/2014 |
| WO | 2012/160567 A1 | 11/2012 |
| WO | 2013/056345 A1 | 4/2013 |
| WO | 2016/089744 A1 | 6/2016 |

OTHER PUBLICATIONS

Response to Office Action filed on Aug. 12, 2020, for Korean Patent Application No. 10-2020-7010510, dated Jun. 12, 2020, 20 Pages (17 pages of official copy & 3 pages of English translation of claims).
Office Action Received for Chinese Patent Application No. 201580071489.4, dated Sep. 14, 2020, 31 pages (13 pages of Official Copy and 18 pages of English translation).
Office Action received for Korean Patent Application No. 10-2020-7010510, dated Jun. 12, 2020, 9 pages (5 pages of Official Copy and 4 pages of English Copy).
Office Action received for Chinese Patent Application No. 201580071489.4, dated Apr. 7, 2020, 23 pages (12 pages of English Translation and 11 pages of Official Copy).
Response to Office Action filed on Jun. 29, 2020, for Chinese Patent Application No. 201580071489.4, dated Apr. 7, 2020, 15 Pages(10 pages of official copy & 5 pages of English translation of claims).
Response to Office Action filed on Sep. 20, 2019 for Korean Patent Application No. 10-2019-7013855, dated Jul. 22, 2019, 7 pages (4 pages of Official Copy and 3 pages of English Pending Claims).
Applicant Initiated Interview Summary received for U.S. Appl. No. 14/556,627, dated Feb. 26, 2019, 3 pages.
Applicant Initiated Interview Summary received for U.S. Appl. No. 14/556,627, dated Aug. 13, 2018, 3 pages.
Final Office Action received for U.S. Appl. No. 14/556,627, dated Jan. 25, 2019, 28 pages.
Final Office Action Received for U.S. Appl. No. 14/556,627 dated May 2, 2018, 19 pages.
First Action Interview Office Action received for U.S. Appl. No. 14/556,627, dated Oct. 26, 2017, 11 pages.
Non-Final Office Action received for U.S. Appl. No. 14/556,627, dated Jul. 26, 2018, 17 pages.
Notice Of Allowance received for U.S. Appl. No. 14/556,627, dated Jun. 3, 2019, 9 pages.
Pre-Interview First Office Action received for U.S. Appl. No. 14/556,627, dated Jun. 15, 2017, 8 pages.
Response to Final Office Action filed on Jun. 29, 2018, for U.S. Appl. No. 14/556,627, dated May 2, 2018, 14 pages.
Response to Final Office Action filed on Mar. 22, 2019 for U.S. Appl. No. 14/556,627, dated Jan. 25, 2019, 21 pages.
Response to First Action Interview-Office Action Summary filed on Dec. 27, 2017, for U.S. Appl. No. 14/556,627, dated Oct. 26, 2017, 21 pages.
Response to Non-Final Office Action filed on Oct. 22, 2018, for U.S. Appl. No. 14/556,627, dated Jul. 26, 2018, 18 pages.
Office Action received for Korean Patent Application No. 10-2021-7001288 dated Mar. 26, 2021, 7 Pages( 6 Pages of Official Copy & 1 Pages of English Translation).
Office Action received for Chinese Patent Application No. 201580071489.4 dated Mar. 26, 2021, 14 pages (11 pages of Official copy & 3 Pages of English Translation).
Notice of Allowance received for Korean Patent Application No. 10-2021-7001288, dated Sep. 13, 2021, 3 pages (1 page of English translation and 2 pages of official copy).
Decision of Rejection received for Chinese Patent Application No. 201580071489.4, dated Sep. 7, 2021, 11 pages (8 pages of official copy and 3 pages of English translation).
Tang et al., "Novice Learning Excel 2007 Office Practice Skills 1000 Cases", China Railway Publishing House, 2009, 17 pages.
Zhang, "Research on Commodity Digital Display Based on Network Consumers", Beijing University of Technology Press, Apr. 2013, 17 pages.
Final Office Action received for Korean Patent Application No. 10-2017-7018062, dated Dec. 31, 2018, 6 pages (3 pages of English Translation and 3 pages of Official Copy).
Final Office Action received for Korean Patent Application No. 10-2017-7018062, dated Mar. 14, 2019, 6 pages (3 pages of Official Copy and 3 pages of English Translation).
Office Action received for Korean Patent Application No. 10-2017-7018062, dated Jun. 28, 2018, 11 pages (7 pages of Official Copy and 4 pages of English pending Claims).
Response to Office Action filed on Aug. 28, 2018, for Korean Patent Application No. 10-2017-7018062, dated Jun. 28, 2018, 31 pages (23 pages of Official Copy and 8 pages of English Translation of Claims).
Response to Office Action filed on Mar. 4, 2019 for Korean Patent Application No. 10-2017-7018062 dated Dec. 31, 2018, 15 pages (11 pages of Official Copy and 4 pages of English Claims).
Written Opinion received for PCT Application No. PCT/US2015/062938, dated Feb. 3, 2016, 9 pages.
International Preliminary Report on Patentability received for PCT Application No. PCT/US2015/062938, dated Jun. 15, 2017, 11 pages.

(56) References Cited

OTHER PUBLICATIONS

International Search Report received for PCT Application No. PCT/US2015/062938, dated Feb. 3, 2016, 2 pages.
Office Action received for Korean Patent Application No. 10-2019-7013855 dated Jul. 22, 2019, 5 pages (3 pages of Official Copy and 2 pages of English translation).

* cited by examiner

MOBILE OPTIMIZED SHOPPING COMPARISON

CLAIM PRIORITY

This application is a continuation of and claims priority to U.S. patent application Ser. No. 14/556,627, filed Dec. 1, 2014, entitled "Mobile Optimized Shopping Comparison," the entire disclosure of which is hereby incorporated by reference herein in its entirety.

TECHNICAL FIELD

This application relates to data processing. In particular, example embodiments may relate to systems and methods for comparing item attributes in an online marketplace.

BACKGROUND

Typically, when comparing multiple articles of merchandise, there is a tradeoff between features and price. Therefore, it is often necessary for a user to compare a variety of item attributes before deciding on the item they wish to purchase. Users may wish to compare a variety of different item attributes based on the type of item for which they are searching. Current technology has allowed users to search for and purchase items in an online marketplace via a mobile device. It is often difficult to compare multiple results on a mobile device due to screen size and resolution without going back and forth from an item summary to full item details. Further, users may not always be aware of the most important item attributes to compare between certain types of items. As a result, a user may not make a fully informed decision, or may simply choose to avoid comparing items on their mobile device.

BRIEF DESCRIPTION OF THE DRAWINGS

Various ones of the appended drawings merely illustrate example embodiments of the present disclosure and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure describe systems and methods for improvements to online shopping comparisons on client devices. An online shopping comparison may be established between a client device and an application server of a content publisher and may include the presentation of content on the client device. For example, an online shopping comparison may include searching, viewing, and comparing multiple items before purchasing the items offered for sale in an online marketplace. As used herein, a "user" or an "entity" may be a person (e.g., a human), a business (e.g., a company), an organization, a group of people, a persona (e.g., a fictitious character), a bot, or any combination thereof.

The method may further include generating and causing the presentation of an interface that includes a visual representation of the item attribute comparison. These interfaces may allow a user to navigate through a number of item attributes associated with a number of items. In this manner, a user may be able to quickly and easily compare relevant attributes between a number of items on their mobile device, without the need to move back and forth between multiple item summaries and item details. Additionally, a user may avoid repeating operations that the user typically performs multiple times when comparing item attributes.

Aspects of the present disclosure may also include systems and methods for grouping the visual representations of the items and item attribute comparisons. Further aspects of these embodiments of the present disclosure may include automatically generating a list of the most relevant item attributes to compare, as well as a list of item suggestions based on historical data associated with a particular query.

Figure 1:
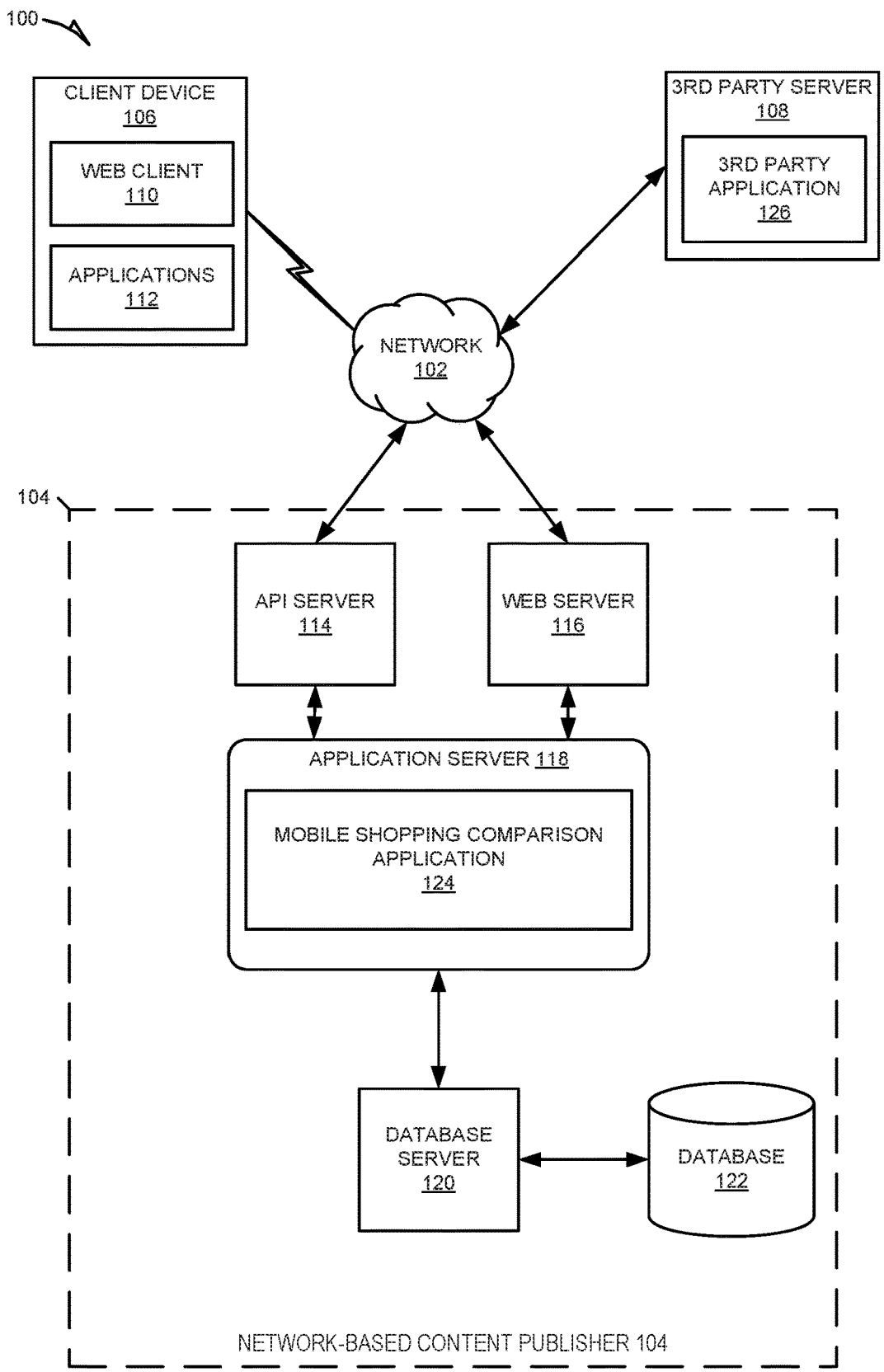
FIG. 1 is a network diagram depicting a network system having a client-server architecture configured for exchanging data over a network, according to an example embodiment.

FIG. 1 is a network diagram depicting a network system 100, according to one embodiment, having a client-server architecture configured for exchanging data over a network 102. While the network system 100 is depicted as having a client-server architecture, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 1. Moreover, it shall be appreciated that although the various functional components of the network system 100 are discussed in the singular sense, multiple instances of any one of the various functional components may be employed.

The network system 100 may include a network-based content publisher 104 in communication with a client device 106 and a third party server 108. In some example embodiments, the network-based content publisher 104 may be a network-based marketplace (e.g., eBay.com). The network-based content publisher 104 may communicate and exchange data within the network system 100 that may pertain to various functions and aspects associated with the network system 100 and its users. The network-based content publisher 104 may provide server-side functionality, via a network 102 (e.g., the Internet), to network devices such as the client device 106.

The client device 106 may be operated by users who use the network system 100 to exchange data over the network 102. These data exchanges may include transmitting, receiving (communicating), and processing data to, from, and regarding content and users of the network system 100. The data may include, but are not limited to, images; video or audio content; user preferences; product and service feedback, advice, and reviews; product, service, manufacturer, and vendor recommendations and identifiers; product and service listings associated with buyers and sellers; product and service advertisements; auction bids; transaction data; user profile data; and social data, among other things.

The client device 106 may interface with the network-based content publisher 104 via a connection with the network 102. Depending on the form of the client device 106, any of a variety of types of connections and networks 102 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 102 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 102 may be a Wireless Fidelity (Wi-Fi, IEEE 602.11x type) connection, a Worldwide Interoperability for Microwave Access (WiMAX) connection, or another type of wireless data connection. In such an embodiment, the network 102 may include one or more wireless access points coupled to a local area network (LAN), a wide area network (WAN), the Internet, or another packet-switched data network. In yet another example, the connection to the network 102 may be a wired connection (e.g., an Ethernet link), and the network 102 may be a LAN, a WAN, the Internet, or another packet-switched data network. Accordingly, a variety of different configurations are expressly contemplated.

In various embodiments, the data exchanged within the network system 100 may be dependent upon user-selected functions available through one or more client or user interfaces (UIs). The UIs may be associated with a client device, such as the client device 106 executing a web client 110 (e.g., an Internet browser), which may be in communication with the network-based content publisher 104. The UIs may also be associated with one or more applications 112 executing on the client device 106, such as a mobile application designed for interacting with the network-based content publisher 104 or with a social network platform hosted by the third party server 108.

Turning specifically to the network-based content publisher 104, an Application Program Interface (API) server 114 and a web server 116 are coupled to, and provide programmatic and web interfaces respectively to, an application server 118. As illustrated in FIG. 1, the application server 118 may be coupled via the API server 114 and the web server 116 to the network 102, for example, via wired or wireless interfaces. The application server 118 is, in turn, shown to be coupled to a database server 120 that facilitates access to a database 122. In some examples, the application server 118 can access the database 122 directly without the need for the database server 120. The database 122 may include multiple databases that may be internal or external to the network-based content publisher 104.

The application server 118 may, for example, host one or more applications, which may provide a number of content publishing and viewing functions and services to users who access the network-based content publisher 104. For example, the network-based content publisher 104 may host a marketplace application that provides a number of marketplace functions and services to users, such as publishing, listing, and price-setting mechanisms whereby a seller may list (or publish information concerning) goods or services (also collectively referred to as "products") for sale, a buyer can express interest in or indicate a desire to purchase such goods or services, and a price can be set for a transaction pertaining to the goods or services.

As illustrated in FIG. 1, the application server 118 hosts a mobile shopping comparison application 124 that provides message generation and publishing services to users of the network-based content publisher 104. For example, the mobile shopping comparison application 124 may receive requests from a user to share a product listing with one or more other users, and in turn, the mobile shopping comparison application 124 may generate and facilitate the publishing of a message to share the product listing. The mobile shopping comparison application 124 may cause the messages to be "published" in the sense that they are communicated, albeit through a variety of means, to other users or entities.

The messages generated and published by the mobile shopping comparison application 124 may also include a reference to content (e.g., a link). As used herein, the terms "content" or "content item" refer to electronic data that is consumed by viewers (e.g., users) on displays, client devices, or page/display-based media (e.g., World-Wide Web (WWW) media embodied in browsers and accessible over the Internet). As such, the terms "content" and "content item" may refer to data associated with readable text, data associated with images, data associate with graphics or video, programmatic content, scripts, or data corresponding to various combinations of these.

Consistent with some embodiments, users may utilize the mobile shopping comparison application 124 to generate messages that are separate from and independent of any existing content. For example, users may utilize the mobile shopping comparison application 124 to automatically generate a status update. Further, while the mobile shopping comparison application 124 is shown in FIG. 1 to form part of the network-based content publisher 104, it will be appreciated that, in alternative embodiments, the mobile shopping comparison application 124 may form part of a service that is separate and distinct from the network-based content publisher 104.

The database 122 may comprise a number of repositories used to store data pertaining to various functions and aspects associated with the network system 100 and its users. For example, the database 122 may include a repository to store and maintain user profiles for users of the network-based content publisher 104. Each user profile may comprise user profile data that describes aspects of a particular user. The user profile data may, for example, include demographic data, user preferences, social data, and financial information. The demographic data may, for example, include information describing one or more characteristics of a user such as gender, age, location information (e.g., hometown or current location), employment history, education history, contact information, familial relations, or user interests. The financial information may, for example, include private financial information of the user such as account number, credential, password, device identifier, user name, phone number, credit card information, bank information, transaction history, or other financial information which may be used to facilitate online transactions by the user.

The database 122 may also include a repository to store a record of user activity data. Accordingly, the network-based content publisher 104 may monitor, track, and record the activities of users utilizing one or more devices (e.g., the client device 106) to interact with the various components of the network system 100. Each user session may be maintained in a repository stored in the database 122. Accordingly, the user activity data may include past keyword searches that users have performed, web pages viewed by each user, products added to a user wish list or watch list, products added to an electronic shopping cart, and products that the users own. Consistent with some embodiments, the repository used to store records of user activity may be linked to the repository used to store user profile data so as to maintain an association of a user profile with the activities that the corresponding user has performed.

In instances in which the network-based content publisher 104 is a network-based marketplace, the database 122 may include a repository to store product information. Such product information may, for example, include a product identifier (e.g., a title or a model number), a price, a make, a manufacturer, a model, a brand name, a textual description, a size, a style, product dimensions, compatibility information, or any other information that may be used to describe a product. In these instances, the database 122 may also include a repository to store a transaction history of users of the network-based content publisher 104 that includes information related to transactions for products that may be offered for sale by merchants who utilize marketplace services provided by the network-based content publisher 104. The transaction history information may, for example, include a description of a product offered for sale, sold, or purchased by users, an identifier of the product, a category to which the product belongs, a purchase price, a purchase date, a purchased quantity, a number of bids for the product, or various combinations thereof.

FIG. 1 also illustrates a third party application 126 executing on the third party server 108 that may offer information or services to the application server 118 or to users of the client device 106. The third party application 126 may have programmatic access to the network-based content publisher 104 via a programmatic interface provided by the API server 114. The third party application 126 may be associated with any organization that may conduct transactions with or provide services to the application server 118 or to users of the client device 106. For example, the third party application 126 may be associated with a network based social network platform (e.g., Facebook®, Twitter®, Google+®, Pinterest®, LinkedIn®, or the like) that may provide a platform for members to build and maintain social networks and relations among members.

Figure 2:
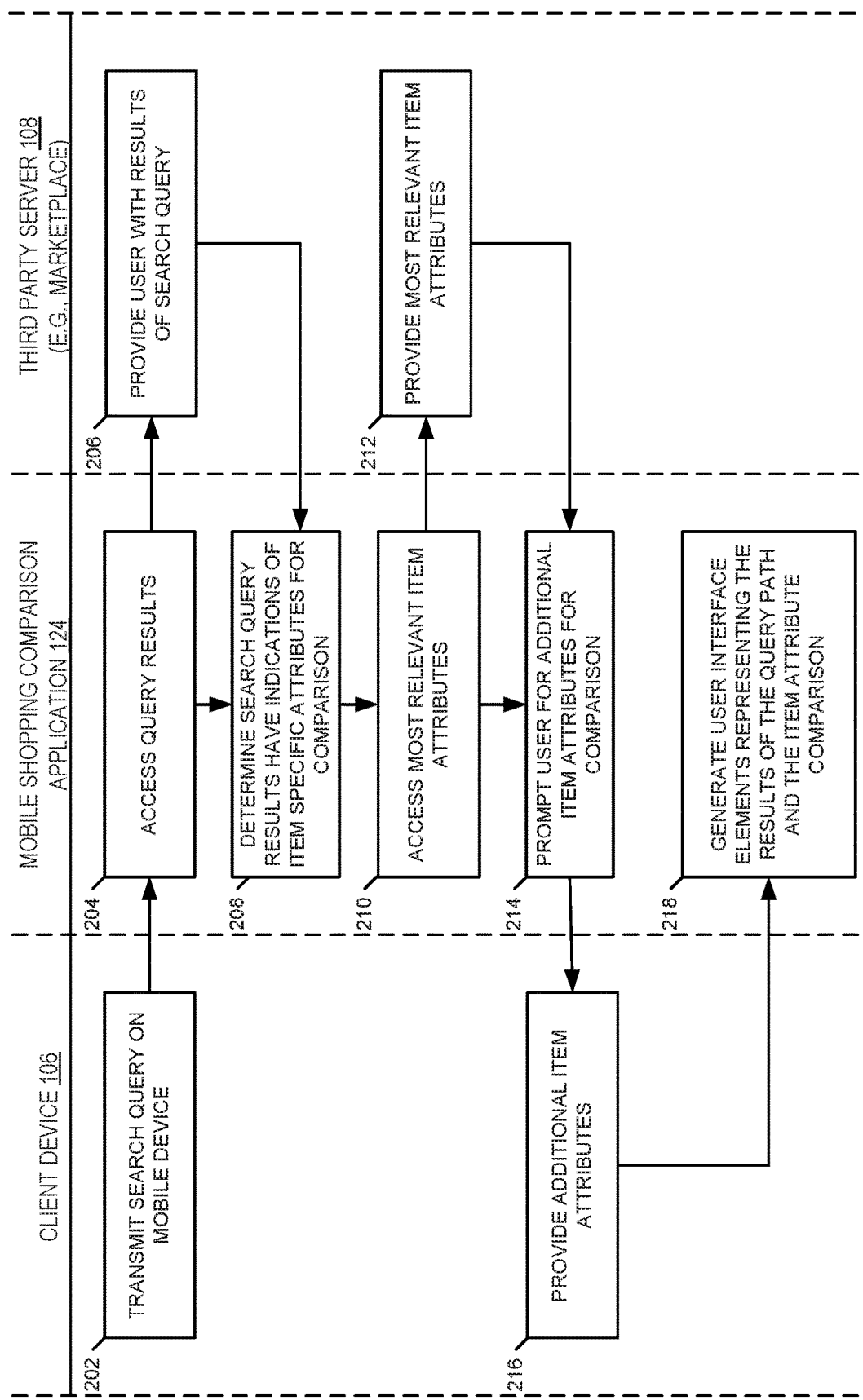
FIG. 2 is an interaction diagram depicting example exchanges between a client device, an application server, and a third party server, consistent with some embodiments.

FIG. 2 is an interaction diagram depicting example exchanges between a client device, an application server, and a third party server, consistent with some embodiments. In particular, FIG. 2 depicts example exchanges between the client device 106, the mobile shopping comparison application 124, and the third party server 108, which, in this example embodiment, corresponds to an online marketplace (e.g., ebay.com). As shown, at operation 202, the client device 106 (the user of which is referred to as the "requesting user" or "requestor") transmits a query request for an item using a mobile device, which in this example is to generate a list of relevant items in an online marketplace.

At operation 204, the mobile shopping comparison application 124 accesses the third party server 108 (e.g., an online store or marketplace) and at operation 206 retrieves relevant search results to the query request. The relevance of the results may be based on query-dependent or query-independent criteria. For example, query-dependent criteria generally identifies the degree to which a document or item is semantically related to the content of the query itself, while query-independent criteria seek to measure the relevance of a particular document or item based on intrinsic properties of the document or item itself. These properties may include information pertaining to other users who may be similar or related to a querying user, who may have searched for and selected a particular item, as well as information corresponding to the querying user themselves. In some embodiments, the search results may include one or more items found in an online marketplace, wherein each item may have associated with it: an item summary, an item description, one or more images, relevant item attributes, transaction information, and user activity data.

At operation 208, in response to receiving the results of the query request, a determination is made if the query request results have indications of item specific attributes for comparison, because a user may wish to compare specific item attributes corresponding to different items prior to making a decision on an item for purchase. For example, a user searching for a personal computer to purchase, may wish to compare item attributes associated specifically with televisions, such as operating system, quantity of RAM, the type of processor, etc., while a user searching for a television to purchase may choose to compare an entirely different set of item attributes associated specifically with televisions, such as size, definition, color or black and white, and so on. In some embodiments this may occur at the client device 106, the application server 118, or at the third party server 108.

In some embodiments, the determination that the results of the query request have indications of item specific attributes for comparison may be achieved by recognizing that the item attributes corresponding with the results of the query request have a high degree of correlation. In some embodiments, the item attribute comparison module 404 may be configured to compare the item attributes corresponding to the results of the query request, and determine that the items have item attributes for comparison when a majority of the results share one or more item attributes in common. In other embodiments, the item attribute comparison module 404 may determine that the items have item attributes for comparison when the item attributes of the search results are specific to a particular category of item. For example, if the results of a query request comprised one or more flat-screen TVs, with each listing including size in inches, brand, and screen resolution, a determination could be made that the query request results share item attributes with a high degree of correlation.

In further embodiments, the determination that the query request has indications of item specific comparison may be achieved by recognizing that the user is toggling between two or more item descriptions, or viewing multiple listings for similar products at once. In even further example embodiments, the determination that the query request has indications of item specific comparison may be based on a category that the user is searching, wherein the category is one that typically has item specific comparison criteria. In these embodiments item attribute comparison module 404 may be configured to determine that a particular category of item will always have item specific attributes for comparison. For example, the item attribute comparison module 404 may be configured to automatically determine that all query requests related to televisions will have certain item specific attributes for comparison, such as size, resolution, brand, etc.

Once a determination has been made that the query results contain indications of item specific criteria, at operation 210, the mobile shopping comparison application 124 may query the third party server 108 to access the most relevant item attributes to provide to the user for the purposes of comparison. The item attribute identification module 406 may be configured to determine which of the item specific attributes are most relevant for comparison. The particular item attributes selected by the item attribute identification module 406 may be based on the category which the items within the query results are from, which item attributes are most often compared by users, item attributes which the user most often compares, which item attributes appear most frequently in the corresponding search results, as well as which item attributes have the highest conversion rates. In some embodiments the user may select specific item attributes which they wish to compare through a user interface. For example, the user may manually select a specific set of item attributes corresponding to a particular category of items, which the item attribute identification module 406 may then use in determining which item attributes are most relevant.

At operation 212, upon receiving a request for the most relevant item attributes, the third party server 108 may provide the application server 118 with a list of relevant attributes. This may be based on conversion rate optimization, wherein the item attributes with the highest conversion rate are presented to the user. Conversion rate optimization is the method of creating an experience for a website or landing page with the goal of increasing the percentage of visitors that may convert into customers. In this context, a conversion rate is defined as the percentage of visitors who complete a goal, set by the site owner. Here, the goal may be to purchase a particular item. In some embodiments, the presentation module 410 may be configured to only present the specific item attributes selected by the item attribute identification module 406, while in other embodiments the presentation module 410 may present the item attributes selected by item attribute identification module 406, in conjunction with a list of standard item attributes which may apply broadly to all items posted within an online marketplace, such as price, item location, and information corresponding to the seller. In other embodiments, the user may be able to select specifically how many item attributes are to be displayed for comparison by the presentation module 410, through an interactive user interface.

At operation 214, the item attribute identification module 406 may prompt the user to identify specific item attributes for comparison between items. The user may then select, via a user interface, one or more additional item attributes which correspond to a particular item to compare. In some embodiments, the user may be presented with a list of item attributes corresponding to items which, at operation 216, the user may then provide the item attribute identification module 406 with additional item attributes.

Once a list of item attributes has been created, the presentation module 406 may generate UI elements representing the results of the query request and the item attributes for comparison, as in operation 218. The UI element representing the results of the query request may contain information such as a product title, one or more images of the item, and an item description. In some embodiments, a user may be able to select from one or more items to view in the display by selecting items from a list of results. In further embodiments, a user may navigate the search results through a recognized gesture performed on a client device. The recognized gesture may be pressing a button or a swiping motion on a touch enabled device. In even further example embodiments, the most popular or highest rated item may be automatically displayed to the user as a default.

In some embodiments, the UI representing the item attributes may be a static item attributes panel that changes values while fixing the attribute titles as a user scrolls through the list of results. The item attributes that are displayed may be manually selected by the user themselves, or in other embodiments, may be determined by selecting the item attributes with the highest degree of correlation, or with the highest conversion rate. In further embodiments, the item attributes displayed may be based upon the category in which the queried items are categorized.

Figure 3A:
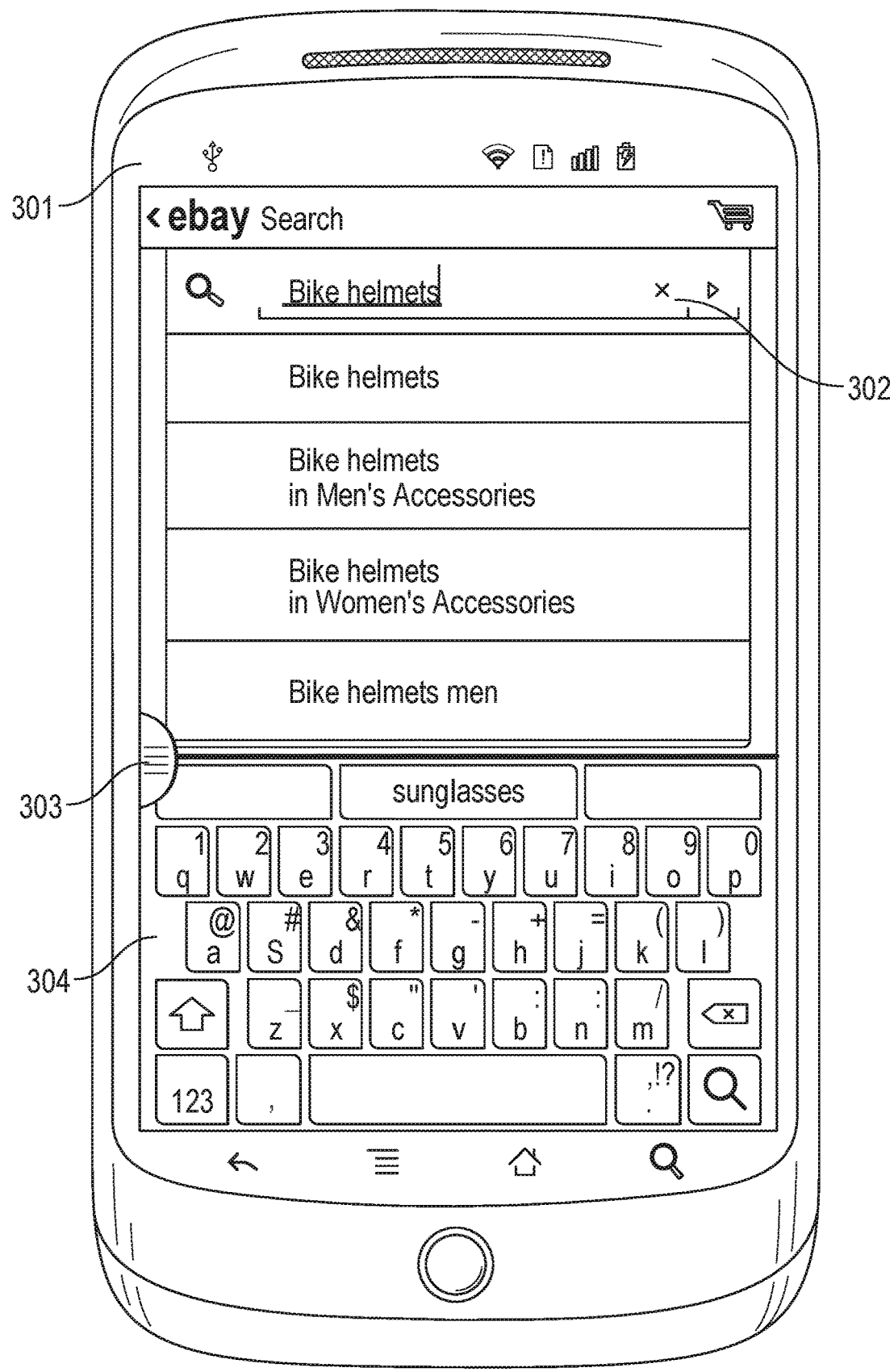
FIG. 3a is an interface diagram depicting an example query request, consistent with some embodiment.

FIG. 3a is an interface diagram depicting a query request interface 301 displaying visual representations of various states of the US, consistent with some embodiments. In particular, this query request interface 301 includes elements 302 and 304, which are visual representations of a search query and an alphanumeric keyboard, respectively. As shown, a user may enter a desired search query 302 through use of the keyboard 304. In further embodiments, the search query may be entered by means of voice recognition.

The query request interface 301 may further include a tab 303, which may be used to hide or expand aspects of the query request interface. In some embodiments, a user may hide the keyboard 304 via a recognized gesture on a touch enabled device.

Figure 3B:
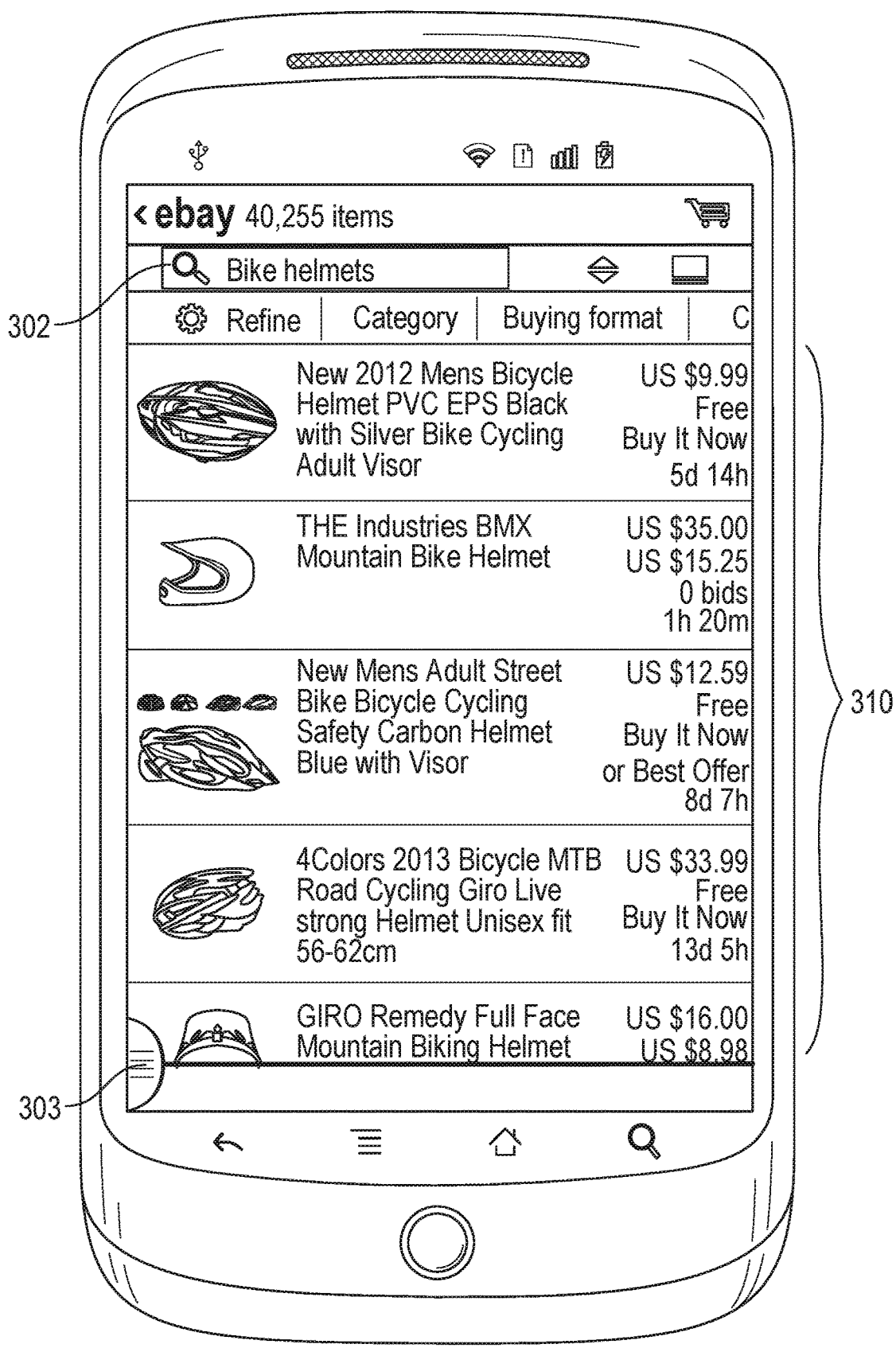
FIG. 3b is an interface diagram depicting further exchanges of the example query request, consistent with some embodiments.

FIG. 3b is an interface diagram depicting a search query 302, as in FIG. 3a, and its corresponding search results 310. The search results 310 may be based on query-dependent or query-independent criteria. In some embodiments, a user may be able to sort the results based on item attributes such as price, size, brand, color, item location, and other attributes associated with the items.

Figure 3C:
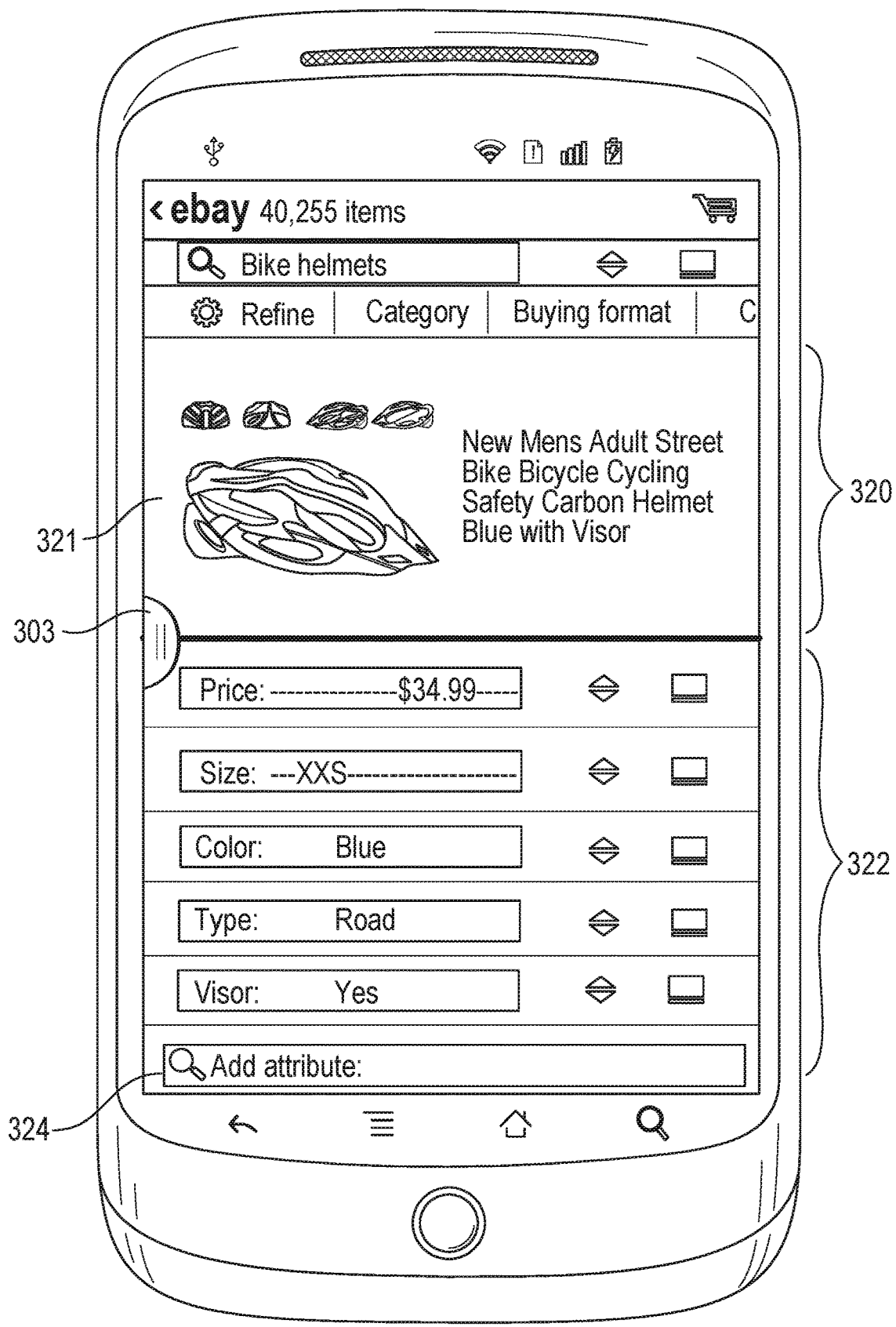
FIG. 3c is an interface diagram depicting even further exchanges of the example query request, consistent with some embodiments.

FIG. 3c is an interface diagram depicting a first UI element 320 configured to present an item 321 selected from one or more of the search results 310 from FIG. 3b, in conjunction with a second UI element 322, configured to present one or more item attributes corresponding to the selected item 321. The tab 303 may be used to hide or expand the sizes of the first and second UI elements 320 and 322, based on a corresponding recognized gesture on a touch enabled device. In some embodiments, a user may be able to prioritize or sort the item attributes displayed in the second UI based on their own preference. The second UI element 322 may further include a user selectable option 324 to add additional item attributes for comparison. In further embodiments, a user may set a desired range or specify aspects of the item attributes which they may be particularly interested in finding through selection of a pre-defined button or icon. For example, a user may primarily be interested in viewing blue helmets within a price range of $30 and $40. By selecting a specified price range and adding desired details to the item attribute, the second UI element 322 may indicate to the user a level of compliance of an item to their specified criteria. In some embodiments this may be achieved by highlighting each item attribute in a corresponding color or pattern which indicates a level of compliance, with specific colors or patterns assigned to varying levels of compliance. For example, a high level of compliance may be represented by highlighting an item attribute in green, while a low level of compliance may be represented by highlighting an item attribute in red.

In further embodiments, a visual indicator is also presented illustrating where a particular item attribute value is in comparison with the overall results. For example, in FIG. 3c this is illustrated by placing the corresponding item attribute value on a scale, wherein a position at the far left of the scale indicates that the corresponding value is among the lowest value of the overall results, whereas a position to the right side of the scale indicates a corresponding value among the higher values of the overall results. In FIG. 3c the corresponding price value is illustrated as being positioned toward the right side of the scale, indicating that the price value is among the more expensive values of the overall results, while the corresponding size value is positioned to the left side of the scale, indicating that the corresponding item is among the smallest of the overall results.

Figure 3D:
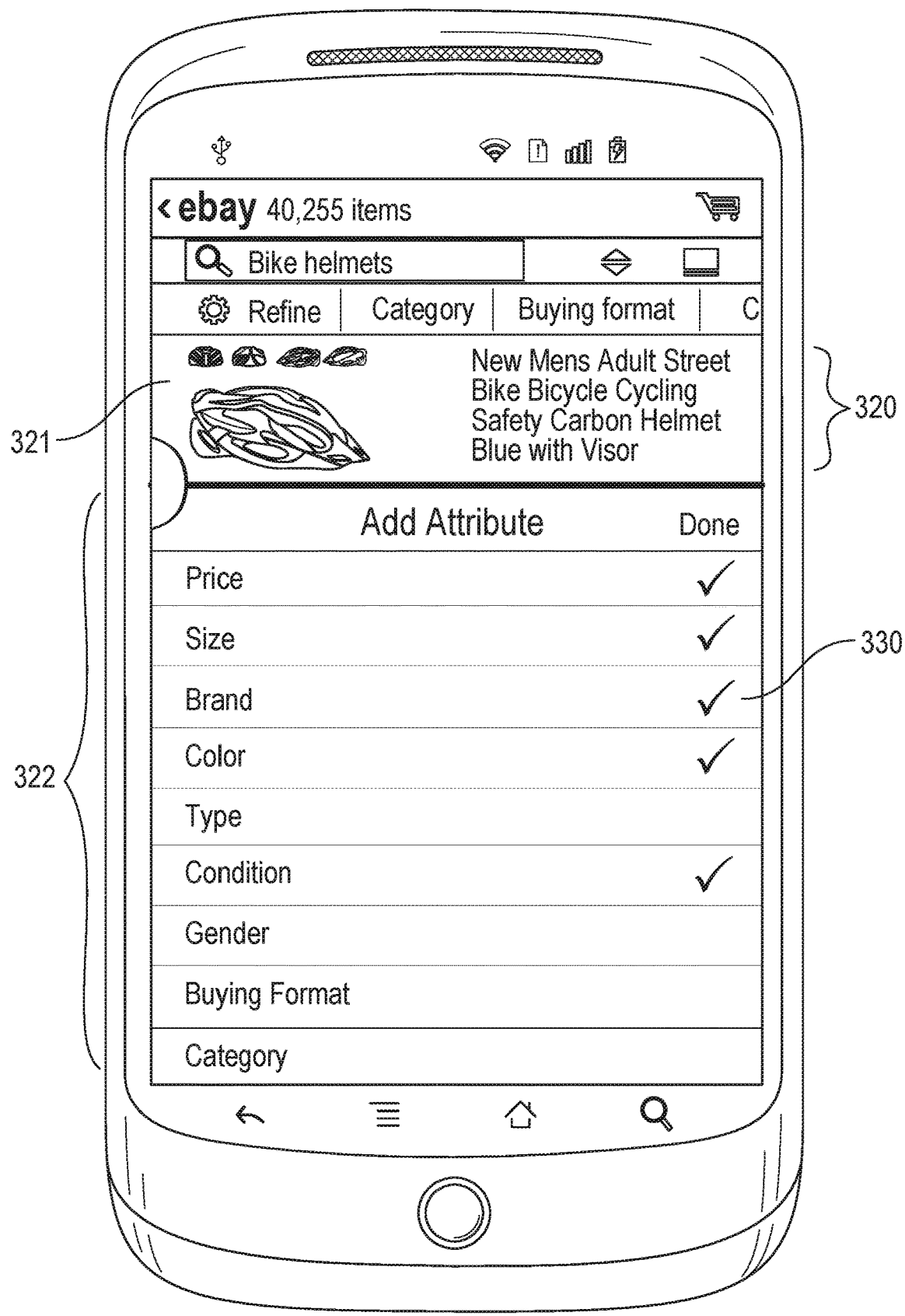
FIG. 3d is an interface diagram depicting even further exchanges of the example query request, consistent with some embodiments.

FIG. 3d is an interface diagram depicting a first UI element 320, in conjunction with a second UI element 322, where the second UI element 322 is configured to present one or more user selectable item attributes 330 corresponding to the selected item 321. In some embodiments, a user may manually add or remove item attributes to be displayed in the second UI element 322 by placing a check mark beside the relevant attribute, or through a similar means of indicating the selection of an item. In further example embodiments, a user may be given the option to select the "top," or "most popular," attributes associated with a particular category of items. The "top," or "most popular," may be selected based on the degree of correlation between the items listed in the results of a search query, or based on what other users historically considered when viewing a particular item. For example, the item attribute identification module 406 may be configured to compare all item attributes corresponding to a particular set of search results, and determine that the item attributes which appear most frequently in relation to the particular category of item are the "top" attributes. The item attribute identification module 406 may also identify the corresponding item attributes which are most frequently selected for comparison by users, when viewing a particular category of item.

Figure 3E:
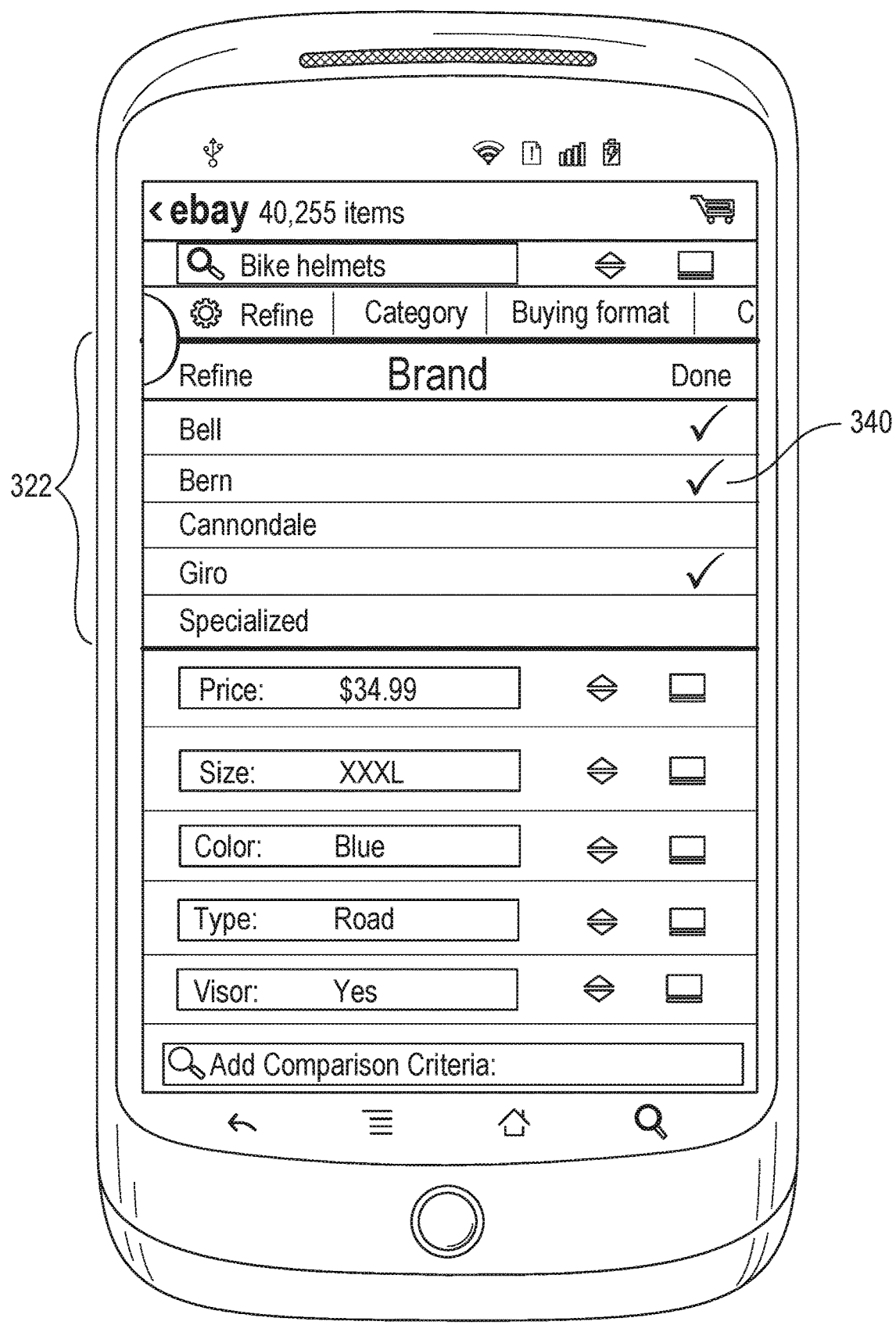
FIG. 3e is an interface diagram depicting even further exchanges of the example query request, consistent with some embodiments.

As discussed above, a user may be able to set criteria or a desired range associated with each item attribute displayed in the second UI element 322. FIG. 3e is an interface diagram depicting a second UI element 322. In some embodiments, a user may select details or set limits associated with item attributes. Consistent with some embodiments, this may be accomplished by affixing a check mark beside specific details a user may desire, or alternatively by setting an acceptable range. For example, a user may select specific brands that they may prefer by placing a check mark beside a brand they may desire. In selecting details or limits for each item attribute, in some embodiments, the user may be enabled to sort the search query results by displaying items with the highest compliance to their selected details or limits in order of compliance.

Figure 4:
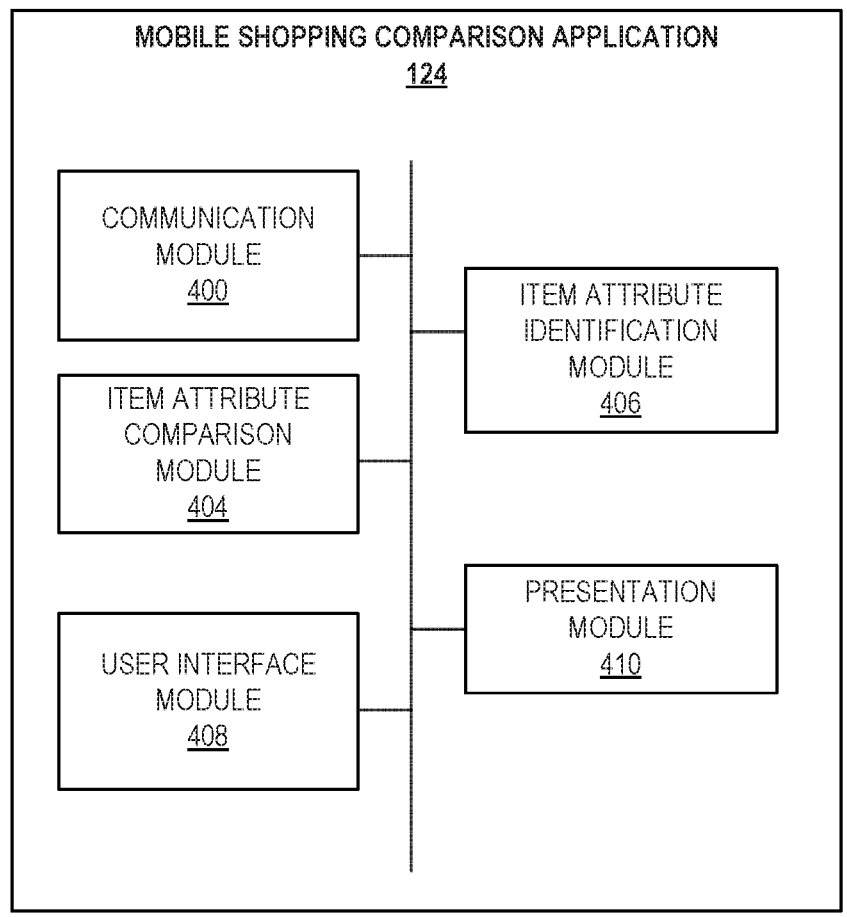
FIG. 4 is a block diagram illustrating an example embodiment of multiple modules forming a mobile optimized comparison application, which is provided as part of the network system of FIG. 1.

FIG. 4 is a block diagram illustrating various functional modules of a mobile shopping comparison application 124, which is provided as part of the network system 100, consistent with some embodiments. The mobile shopping comparison application 124 is shown as including a communications module 400, an item attribute comparison module 404, an item attribute identification module 406, a UI module 408, and a presentation module 410, all configured to communicate with each other (e.g., via a bus, shared memory, a switch, or APIs). The various modules of the mobile shopping comparison application 124 may, furthermore, access the databases 122 via the database servers 120, and each of the various modules of the mobile shopping comparison application 124 may be in communication with one or more of the third party applications 126 (e.g., online marketplace). Further, while the modules of FIG. 4 are discussed in the singular sense, it will be appreciated that in other embodiments multiple modules may be employed.

The communication module 400 is responsible receiving query requests from a user, to retrieve items displayed within an online marketplace. The communication module 400 may also be configured to receive user inputs from the user, such as input by the user with a keyboard or touch enabled device, voice recognition, as well as data corresponding to a user's location.

The item attribute comparison module 404 is configured to determine that a query request has indications that the results of the request will have item specific attributes for comparison. For example the result of a user's query may comprise two or more similar items with varying values for corresponding item attributes. Such results may require a user to compare the corresponding item attributes in order to decide which item among the results they may wish to purchase. The item attribute comparison module 404 may be configured to determine that a query request has indications of item specific attributes for comparison when: a majority of the query results share one or more item attributes in common; the item attributes of the search results are generally considered to be exclusive to a particular category of item; the user toggles between two or more item descriptions, or views multiple listings for similar products in a single communication session.

In some embodiments, the item attribute comparison module 404 may determine that a query request has indications that the results have item specific attributes for comparison when a majority of the query results share one or more item attributes in common. For example, when a majority of the results of a query request all share one or more item attributes in common with one another, the item attribute comparison module 404 may make a determination that the resulting requests have indications of item specific attributes for comparison.

In some embodiments, the item attribute comparison module 404 may determine that a query request has indications that the results have item specific attributes for comparison when the items corresponding to the query results share item attributes which may generally be considered to be exclusive to a particular category of item. For example, the item attribute comparison module 404 may be configured such that it may recognize and correlate a particular set of item attributes to a particular category of items. In some embodiments this may be based on historical data associated with the online marketplace. In other embodiments it may be based on predetermined criteria set by the user or a user with administrative privileges.

In some embodiments, the item attribute comparison module 404 may determine that a query request has indications of item specific attributes for comparison when the user toggles between multiple items in the query results, which each share one or more item attributes in common. For example, a user may select and view multiple items for viewing out of the query results and in doing so, toggle between two or more items in the query results. Upon detecting that the user is toggling between two or more of the query results, the item attribute comparison module 404 may analyze the particular items which the user is viewing, and upon comparing the corresponding item attributes of those items, determine that the query request has indications of item specific attributes for comparison.

The item attribute identification module 406 is responsible for identifying the most relevant item attributes associated with the results of the query request. The item attribute identification module 406 may determine which item attributes to select for comparison by analyzing: the categorization of the items within the query results, and what the most often viewed attributes in that particular category are; the conversion rates associated with the item attributes; which item attributes have the highest correlation; and what the user's own preferences suggest based on the user's search or transaction history.

In some embodiments, the item attribute identification module 406 may analyze the corresponding category of the items which make up the search results, and select the item attributes which may be most commonly associated with the corresponding category.

In some embodiments, the item attribute identification module 406 may be configured to utilize conversion rate optimization. As discussed above, conversion rate optimization is the method of creating an experience for a website or landing page with the goal of increasing the percentage of visitors that may convert into customers. In this context, a conversion rate is defined as the percentage of visitors who complete a goal, set by the sit owner. Here, the goal may be to purchase a particular item. The item attribute identification module 406 may select the item attributes which have the highest conversion rate.

In some embodiments, the item attribute identification module 406 may select the item attributes with the highest degree of correlation between search results for comparison. For example, the item attribute comparison module 406 may analyze the results of a query request and make a determination that a majority of the search results share one or more specific item attributes in common. The most common item attributes may then be selected for comparison.

In some embodiments, the item attribute identification module 406 may select the specific item attributes for comparison by the user by selecting item attributes corresponding to the user's preferences, based on the user's search or transaction history. For example, the item attribute identification module 406 may access a user's transaction history and determine that a user generally selects items which have certain item attributes in common. In other embodiments, the user may manually set preferred item attributes for comparison through a user interface.

The particular item attributes selected by the item attribute identification module 406 may be based on the category which the items within the query results are from, which item attributes are most often compared by users, item attributes which the user most often compares, which item attributes appear most frequently in the corresponding search results, as well as which item attributes have the highest conversion rates.

The UI module 408 is responsible for generating a navigable UI that presents the results of the query request and the item attributes associated with the results of the query request. In some embodiments, there may be a first UI that presents the results of the query request, and a second UI that presents the item attributes associated with those results. In further embodiments, the first and second UI may be presented in conjunction with one another, such that as the user navigates through the query request results, only one item remains in focus in the first UI, while the item attributes in the second UI remain static with only the associated values changing, based on the correlating item being displayed in the first UI.

In other embodiments the UI may also include: a search field, where a user may enter a search query 302, as is shown in FIG. 3a; a keyboard 304; as well as various item attributes 322, as seen in FIG. 3c, which the user may refine through user input. In further embodiments, the UI module 408 may also be configured to include an image of one or more items from the results of a search request, which a user may select through a recognized gesture, such as touching or swiping on a touch enabled device.

The presentation module 410 is responsible for presenting the corresponding item attributes selected by the item attribute identification module 406 to the UI module 408. In some embodiments, the presentation module 410 may be configured to accept user selected inputs and refinements, and to then retrieve additional item attributes and search results.

Figure 5:
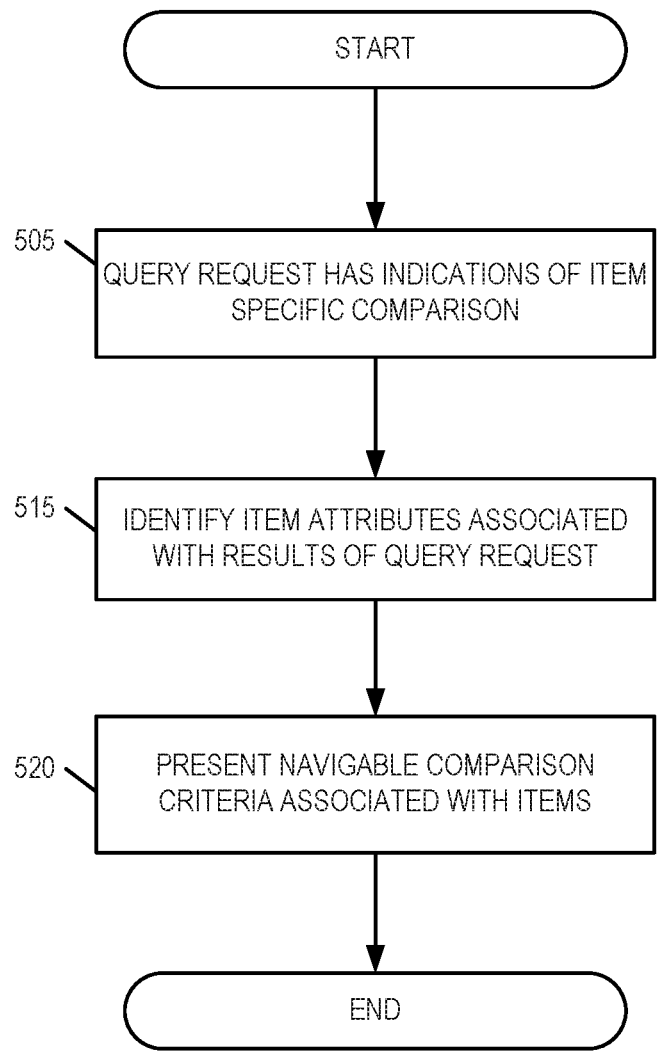
FIG. 5 is a flowchart illustrating an example method of comparing and presenting item attributes, consistent with some embodiments.

FIG. 5 is a flowchart illustrating an example method 500 to present navigable comparison criteria associated with items from the results of a search query, consistent with some embodiments. The method 500 may be embodied in computer-readable instructions for execution by one or more processors such that the steps of the method 500 may be performed in part or in whole by the application server 118. In particular, the method 500 may be carried out by the functional components of the mobile shopping comparison application 124, and accordingly, the method 500 is described below by way of example with reference thereto. However it shall be appreciated that the method 500 may be deployed on various other hardware configurations and is not intended to be limited to the functional components of the mobile shopping comparison application 124.

At operation 505, the item attribute comparison module 404 may determine that a query request has indications of item specific comparison. The result of a user's query may comprise a list of two or more similar items, each with their own item attributes. In some instances, the item attribute comparison module 404 may recognize that the query request has indications of item specific comparison by determining that the item attributes corresponding with the results of the query request have a high degree of correlation. A high degree of correlation between item attributes may suggest that a user may want to compare the associated item attributes before making a decision. In further embodiments, the item attribute comparison module 404 may determine that a query request has indications of item specific comparison based on the specific category in which the item belongs or, alternatively, if the item attribute comparison module 404 detects that a user is alternating between multiple items to view.

At operation 515, in response to the item attribute comparison module 404 determining that the query request has indications of item specific comparison, the item attribute identification module 406 responds by identifying the most relevant item attributes. In some instances, the most relevant item attributes may be defined as those attributes that have the highest conversion rate, highest degree of correlation, or are manually selected by the user most often. In other embodiments, the item attribute identification module 406 may identify the item attributes most commonly associated with a particular query request based on historical data associated with the user, or with the items in the result of the query request.

At operation 520, the query request and the item attributes may be presented to the user by the presentation module 410 in a navigable UI generated by the UI module 408. In some embodiments, the navigable UI may be a conjunction of two independent USs.

Figure 6:
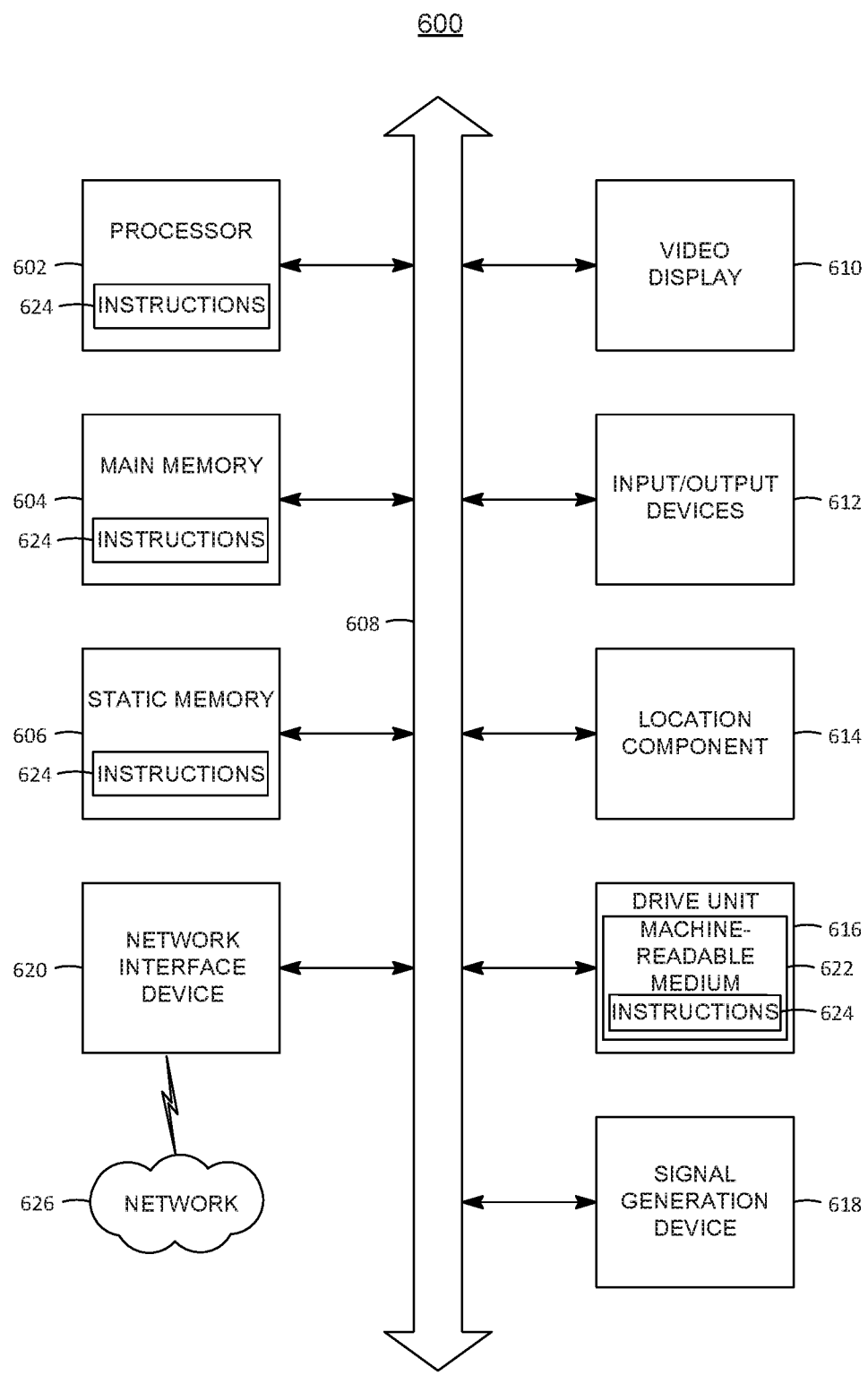
FIG. 6 is a diagrammatic representation of a machine in the example form of a computer system within which a set of instructions for causing the machine to perform any one or more of the methodologies discussed herein may be executed.

FIG. 6 is a diagrammatic representation of a machine in the example form of a computer system 600 within which a set of instructions for causing the machine to perform any one or more of the methodologies discussed herein may be executed. The computer system 600 may correspond to the client device 106, the third party server 108, the API server 114, the web server 116, or the application server 118, consistent with some embodiments. The computer system 600 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a personal digital assistant (PDA), a cellular telephone, a smart phone (e.g., iPhone®), a tablet computer, a web appliance, a handheld computer, a desktop computer, a laptop or netbook, a set-top box (STB) such as those provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 may further include a video display 610 (e.g., a liquid crystal display (LCD) or a cathode ray tube (CRT)). The computer system 600 also includes one or more input/output (I/O) devices 612, a location component 614, a drive unit 616, a signal generation device 618 (e.g., a speaker), and a network interface device 620. The I/O devices 612 may, for example, include a keyboard, a mouse, a keypad, a multi-touch surface (e.g., a touchscreen or track pad), a microphone, a camera, and the like.

The location component 614 may be used for determining a location of the computer system 600. In some embodiments, the location component 614 may correspond to a GPS transceiver that may make use of the network interface device 620 to communicate GPS signals with a GPS satellite. The location component 614 may also be configured to determine a location of the computer system 600 by using an Internet Protocol (IP) address lookup or by triangulating a position based on nearby mobile communications towers. The location component 614 may be further configured to store a user-defined location in the main memory 604 or the static memory 606. In some embodiments, a mobile location enabled application may work in conjunction with the location component 614 and the network interface device 620 to transmit the location of the computer system 600 to an application server or third party server for the purpose of identifying the location of a user operating the computer system 600.

In some embodiments, the network interface device 620 may correspond to a transceiver and antenna. The transceiver may be configured to both transmit and receive cellular network signals, wireless data signals, or other types of signals via the antenna, depending on the nature of the computer system 600.

Machine-Readable Medium

The drive unit 616 includes a machine-readable medium 622 on which is stored one or more sets of data structures and instructions 624 (e.g., software) embodying or used by any one or more of the methodologies or functions described herein. The instructions 624 may also reside, completely or at least partially, within the main memory 604, the static memory 606, and/or the processor 602 during execution thereof by the computer system 600, with the main memory 604, the static memory 606, and the processor 602 also constituting machine-readable media.

Consistent with some embodiments, the instructions 624 may relate to the operations of an operating system (OS). Depending on the particular type of the computer system 600, the OS may, for example, be the iOS® operating system, the Android® operating system, a BlackBerry® operating system, the Microsoft® Windows® Phone operating system, Symbian® OS, or webOS®. Further, the instructions 624 may relate to operations performed by applications (commonly known as "apps"), consistent with some embodiments. One example of such an application is a mobile browser application that displays content, such as a web page or a UI using a browser.

While the machine-readable medium 622 is shown in an example embodiment to be a single medium, the term "machine-readable medium" may include a single medium or multiple media (e.g., a centralized or distributed database, and/or associated caches and servers) that store the one or more data structures or instructions 624. The term "machine-readable medium" shall also be taken to include any tangible medium that is capable of storing, encoding, or carrying instructions (e.g., the instructions 624) for execution by the machine and that cause the machine to perform any one or more of the methodologies of the present disclosure, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. Machine readable media excludes signals per se.

Transmission Medium

The instructions 624 may further be transmitted or received over a network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying the instructions 624 for execution by the machine, and includes digital or analog communications signals or other intangible media to facilitate communication of such software.

Although the embodiments of the present inventive subject matter have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed:

1. A method comprising:
    retrieving, by a computing device, search results based on a search query, the search results comprising a plurality of items that are each described by a plurality of item attributes, each of the plurality of item attributes being defined by a label and a value;
    presenting, by the computing device, a first interface element at a display, the first interface element including the search results and being navigable via input at the display to browse the search results;
    presenting, by the computing device, a second interface element at the display, the second interface element being configured to display information describing at least some of the plurality of item attributes for a search result item currently displayed in the first interface element; and
    modifying, by the computing device, the second interface element by displaying information describing the at least some of the plurality of item attributes for one of the plurality of items responsive to detecting input at the first interface element selecting the one of the plurality of items, each of the at least some of the plurality of item attributes being displayed in a respective data field in the second interface element that:
        displays the label of the item attribute as a fixed title in the data field; and
        displays the value for the item attribute positioned on a scale of values spanning the data field, the scale of values being a spectrum consisting values constrained by a smallest value for the item attribute returned in the search results and a largest value for the item attribute returned in the search results, the value being positioned at a location in the data field corresponding to where the value is positioned on the scale of values.

2. The method of claim 1, wherein the first interface element is presented at a first portion of the display and the second interface element is presented at a second portion of the display that is different from the first portion of the display.

3. The method of claim 1, further comprising receiving at least one value defining a price range for the search results and filtering the search results based on the price range.

4. The method of claim 1, wherein the first interface element includes a visual indication of the one of the plurality of items selected via the input at the first interface element.

5. The method of claim 1, further comprising detecting a swiping motion at the display and navigating among the search results in the first interface element in response to detecting the swiping motion, wherein navigating among the search results includes modifying the second interface element to display the at least some of the plurality of item attributes for a search result item currently displayed in the first interface element during the navigating.

6. The method of claim 1, further comprising:
modifying the display to present a list of the plurality of items included in the search results instead of the first interface element and the second interface element; and
sorting the list of the plurality of items included in the search results based on one of the plurality of item attributes.

7. The method of claim 1, further comprising receiving input describing acceptable ranges for at least two of the plurality of item attributes and filtering the search results based on the acceptable ranges.

8. A system comprising:
one or more processors; and
a computer-readable storage medium having instructions stored thereon that are executable by the one of more processors to perform operations comprising:
retrieving search results based on a search query, the search results comprising a plurality of items that are each described by a plurality of item attributes, each of the plurality of item attributes being defined by a label and a value;
presenting a first interface element at a computing device display, the first interface element including the search results and being navigable via input at the computing device to browse the search results;
presenting a second interface element at the computing device display, the second interface element being configured to display information describing at least some of the plurality of item attributes for a search result item currently displayed in the first interface element; and
modifying the second interface element by displaying information describing the at least some of the plurality of item attributes for one of the plurality of items responsive to detecting input at the first interface element selecting the one of the plurality of items, each of the at least some of the plurality of item attributes for the one of the plurality of items being displayed in a respective data field in the second interface element that:
displays the label of the item attribute as a fixed title in the data field; and
displays the value for the item attribute positioned on a scale of values spanning the data field, the scale of values being a spectrum consisting values constrained by a smallest value for the item attribute returned in the search results and a largest value for the item attribute returned in the search results, the value being positioned at a location in the data field corresponding to where the value is positioned on the scale of values.

9. The system of claim 8, wherein the first interface element is presented at a first portion of the computing device display and the second interface element is presented at a second portion of the computing device display that is different from the first portion of the display.

10. The system of claim 8, the operations further comprising receiving at least one value defining a price range for the search results and filtering the search results based on the price range.

11. The system of claim 8, wherein modifying the second interface element is performed responsive to detecting input selecting the one of the plurality of items in the first interface element and the first interface element includes a visual indication of the one of the plurality of items selected via the input at the first interface element.

12. The system of claim 8, the operations further comprising detecting a swiping motion at the computing device display and navigating among the search results in the first interface element in response to detecting the swiping motion, wherein navigating among the search results includes modifying the second interface element to display the at least some of the plurality of item attributes for a search result item currently displayed in the first interface element during the navigating.

13. The system of claim 8, the operations further comprising:
modifying the computing device display to present a list of the plurality of items included in the search results instead of the first interface element and the second interface element; and
sorting the list of the plurality of items included in the search results based on one of the plurality of item attributes.

14. The system of claim 8, the operations further comprising receiving input describing acceptable ranges for at least two of the plurality of item attributes and filtering the search results based on the acceptable ranges.

15. A method comprising:
transmitting, by a server device, search results to a computing device, the search results comprising a plurality of items that are each described by a plurality of item attributes, each of the plurality of item attributes being defined by a label and a value;
causing, by the server device, the computing device to present a first interface element at a display, the first interface element including the search results and being navigable via input at the display to browse the search results;
causing, by the server device, the computing device to present a second interface element at the display, the second interface element being configured to display information describing at least some of the plurality of item attributes for a search result item currently displayed in the first interface element; and
modifying, by the server device, the second interface element by displaying information describing the at least some of the plurality of item attributes for one of the plurality of items responsive to detecting input at the first interface element selecting the one of the plurality of items, each of the at least some of the plurality of item attributes for the one of the plurality of items being displayed in a respective data field in the second interface element that:
displays the label of the item attribute as a fixed title in the data field; and
displays the value for the item attribute positioned on a scale of values spanning the data field, the scale of values being a spectrum consisting values constrained by a smallest value for the item attribute returned in the search results and a largest value for the item attribute returned in the search results, the value being positioned at a location in the data field corresponding to where the value is positioned on the scale of values.

16. The method of claim 15, wherein the first interface element is presented at a first portion of the display and the second interface element is presented at a second portion of the display that is different from the first portion of the display.

17. The method of claim 15, further comprising receiving at least one value defining a price range for the search results and filtering the search results based on the price range.

18. The method of claim 15, further comprising receiving an indication of a swiping motion at the display and causing the computing device to navigate among the search results in the first interface element in response to receiving the indication of the swiping motion, wherein causing the computing device to navigate among the search results includes modifying the second interface element to display the at least some of the plurality of item attributes for a search result item currently displayed in the first interface element during the navigating.

19. The method of claim 15, further comprising receiving input describing acceptable ranges for at least two of the plurality of item attributes and filtering the search results based on the acceptable ranges.

20. The method of claim 15, further comprising:
modifying the display to present a list of the plurality of items included in the search results instead of the first interface element and the second interface element; and
sorting the list of the plurality of items included in the search results based on one of the plurality of item attributes.

\* \* \* \* \*